United States Patent [19]

Blake et al.

[11] Patent Number: 5,968,814
[45] Date of Patent: Oct. 19, 1999

[54] PORTABLE SYSTEM AND METHOD FOR CONTROLLING AND ABSORBING SPILLS OF PETROLEUM PRODUCTS

[75] Inventors: Stewart P. Blake; Steven H. Kelley; Aubrey L. Hilliard, all of Charlotte, N.C.

[73] Assignee: SpillFix System, L.L.C., Charlotte, N.C.

[21] Appl. No.: 08/626,494

[22] Filed: Apr. 2, 1996

[51] Int. Cl.⁶ .................................................. C10G 32/00
[52] U.S. Cl. ...................... 435/281; 134/104.2; 134/118; 588/252; 588/255
[58] Field of Search .................................... 435/264, 281; 588/249, 252, 255; 134/104.2, 117, 118

[56] References Cited

U.S. PATENT DOCUMENTS

| | | | |
|---|---|---|---|
| 4,981,391 | 1/1991 | Klementovich | 405/52 |
| 5,099,872 | 3/1992 | Tarvin et al. | 137/312 |
| 5,342,525 | 8/1994 | Rowsell | 210/611 |
| 5,567,259 | 10/1996 | Gregory et al. | 156/242 |

*Primary Examiner*—David A. Redding
*Attorney, Agent, or Firm*—Kennedy Covington Lobdell & Hickman, LLP

[57] ABSTRACT

The present invention relates to a portable system for controlling and absorbing petroleum spills, such as occurs upon accidental damage to a diesel fuel tank of a truck. The system has a collapsible containment pool which can be stowed when not in use and then easily deployed to receive petroleum products as they are spilled, a quantity of microbial material for biodegrading petroleum products, a quantity of petroleum-bonding polymer-based material, safety glasses and safety gloves to be worn by the attendant using the system. The system further consists of a bag in which the containment pool can be stowed and a bag in which the microbial material, polymer-based material, safety gloves, and safety glasses can be stowed. Upon discovery of a petroleum spill or potential spill, the containment pool can be quickly deployed into position to receive any spilled petroleum products which can be biodegraded by dispersion of the microbial material onto the petroleum products. Any petroleum products which are spilled into a body of water can be controlled by dispersing the polymer-based material onto the body of water, so that the polymer-based material will bond with the petroleum products to form a residue. The biodegraded petroleum products and any remaining microbial material can be easily removed from the pool, while the residue remaining from the bonded polymer-based material and petroleum products can be removed from a body of water.

8 Claims, 6 Drawing Sheets

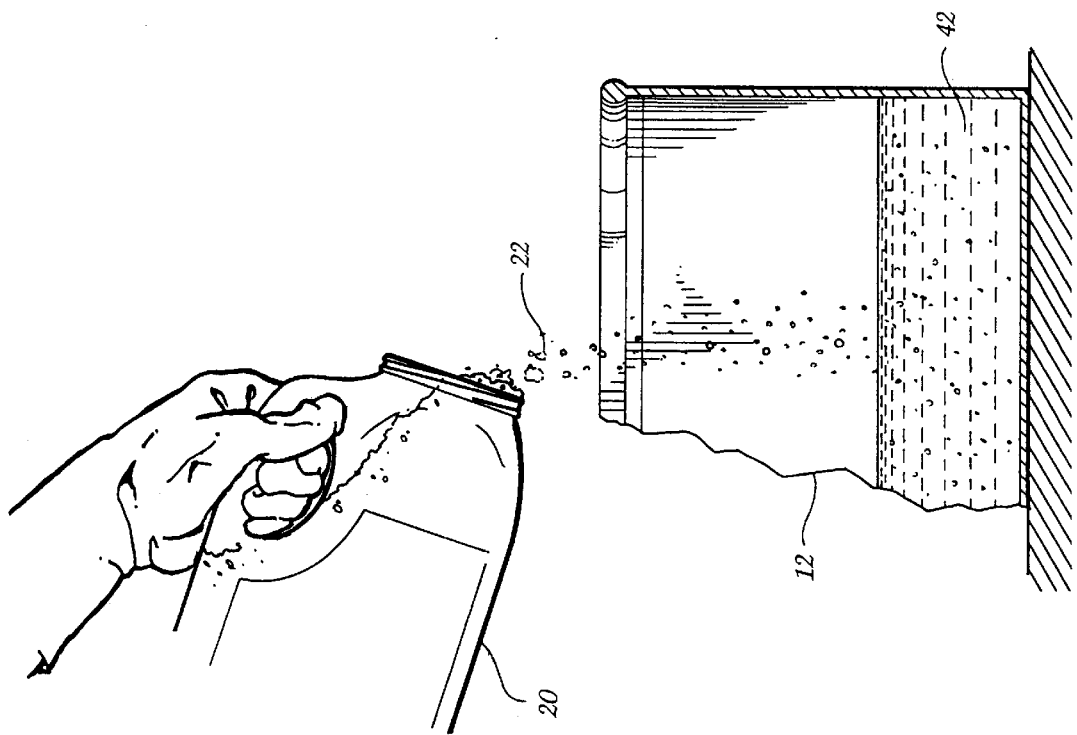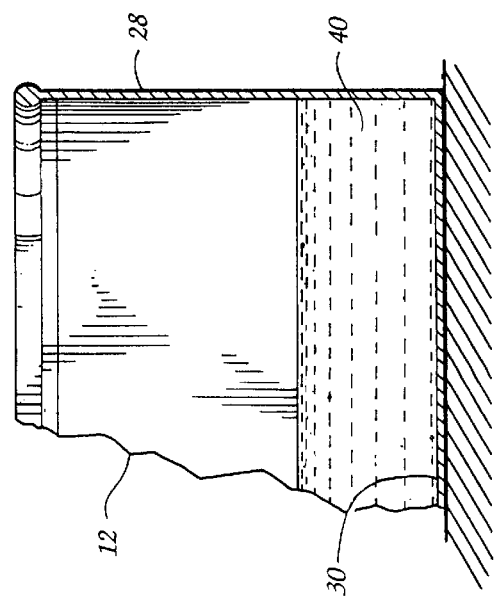

5,968,814

PORTABLE SYSTEM AND METHOD FOR CONTROLLING AND ABSORBING SPILLS OF PETROLEUM PRODUCTS

BACKGROUND OF THE INVENTION

The present invention relates generally to a system and method for controlling and absorbing spills of petroleum products and, more particularly, for controlling and absorbing such spills effectively and expeditiously.

Spills of petroleum products can create serious safety and environmental problems. When such spills emanate from a motor vehicle, such as diesel fuel from a ruptured fuel tank of a truck, the spilled material can create extreme safety hazards on a roadway surface, seriously affecting the ability of other vehicles to brake and steer through such spills. Furthermore, spills of petroleum products can result in harmful pollution of groundwater and earth, thereby causing environmental damage which can be difficult to remedy. Public awareness and concern regarding environmental hazards can be high, and legislation and regulations concerning spills of petroleum products have arisen in many locales.

Certain products are available to assist in controlling and absorbing spills of petroleum products. Among them are the Oppenheimer Formula, a microbe-based cleaner, and Nochar's A610, a polymer-based, petroleum bonding, material. However, many of those individuals who are most likely to have to deal with a petroleum spill, long-haul truck drivers, for example, are in need of a complete system which combines cleaning, biodegrading, and bonding agents with collection materials and safety equipment. Truck drivers, in particular, require a system that is easy to store, relatively lightweight, and capable of being rapidly deployed.

A need still exists, therefore, for a system for controlling and absorbing spills of petroleum products which is effective, which is convenient to store and transport, and which can be quickly brought into action.

SUMMARY OF THE INVENTION

It is accordingly an object of the present invention to provide a complete and portable system for controlling and absorbing petroleum spills on leaks which can be conveniently stored, which can be easily and expeditiously used, and which produces successful results.

Briefly summarized, the present invention accomplishes this objective by including together in a portable system a containment pool deployable at locations at which petroleum products are leaking, for example, during diesel fuel releases from tractor-trailer trucks, with a quantity of microbial materials capable of biodegrading the petroleum products which are received in the containment pool. The microbial materials can be dispersed into the petroleum products in the deployed containment pool in order to begin the biodegradation process.

It is advantageous if the system includes a quantity of petroleum-bonding polymer-based material for dispersion onto any body of water into which petroleum products have spilled, so that the polymer-based material may bond with the petroleum products and form a residue which can be removed from the water.

It is further advantageous if the containment pool includes resilient side walls and a flaccid bottom wall which allow the pool to be collapsed into an easily stowed and relatively small bundle for portability prior to deploying the pool to receive petroleum products.

The system may also include safety glasses and safety gloves to be worn by an attendant deploying the pool and handling the microbial materials or petroleum bonding polymer-based material.

In a preferred embodiment, the system includes a bag for stowing the pool in its collapsed disposition, and a bag for stowing a container containing microbial material, a container containing petroleum bonding polymer-based material, safety glasses and safety gloves.

In accordance with another aspect of the invention, the method of the present invention utilizes a system having a collapsible containment pool, a quantity of microbial materials for biodegrading petroleum products, and, preferably, a quantity of polymer-based material for bonding with petroleum products. In the method, the containment pool is deployed to receive petroleum products leaking from a vehicle, the microbial materials are dispersed into any petroleum products which have spilled into the deployed pool and onto other dry surfaces, the polymer-based material is dispersed onto any body of water into which petroleum products have spilled so as to form a residue, and the residue and any microbial materials remaining after biodegradation of the petroleum products are removed.

The invention will be described in further detail below in terms of an exemplary embodiment of a system for controlling and absorbing petroleum products.

BRIEF DESCRIPTION OF THE DRAWINGS

FIG. 6 is a vertical sectional view of the containment pool containing spilled or leaked petroleum;

FIG. 7 is a view similar to FIG. 6 showing microbial materials being poured into the petroleum in the pool;

DESCRIPTION OF THE PREFERRED EMBODIMENT

Figure 1:
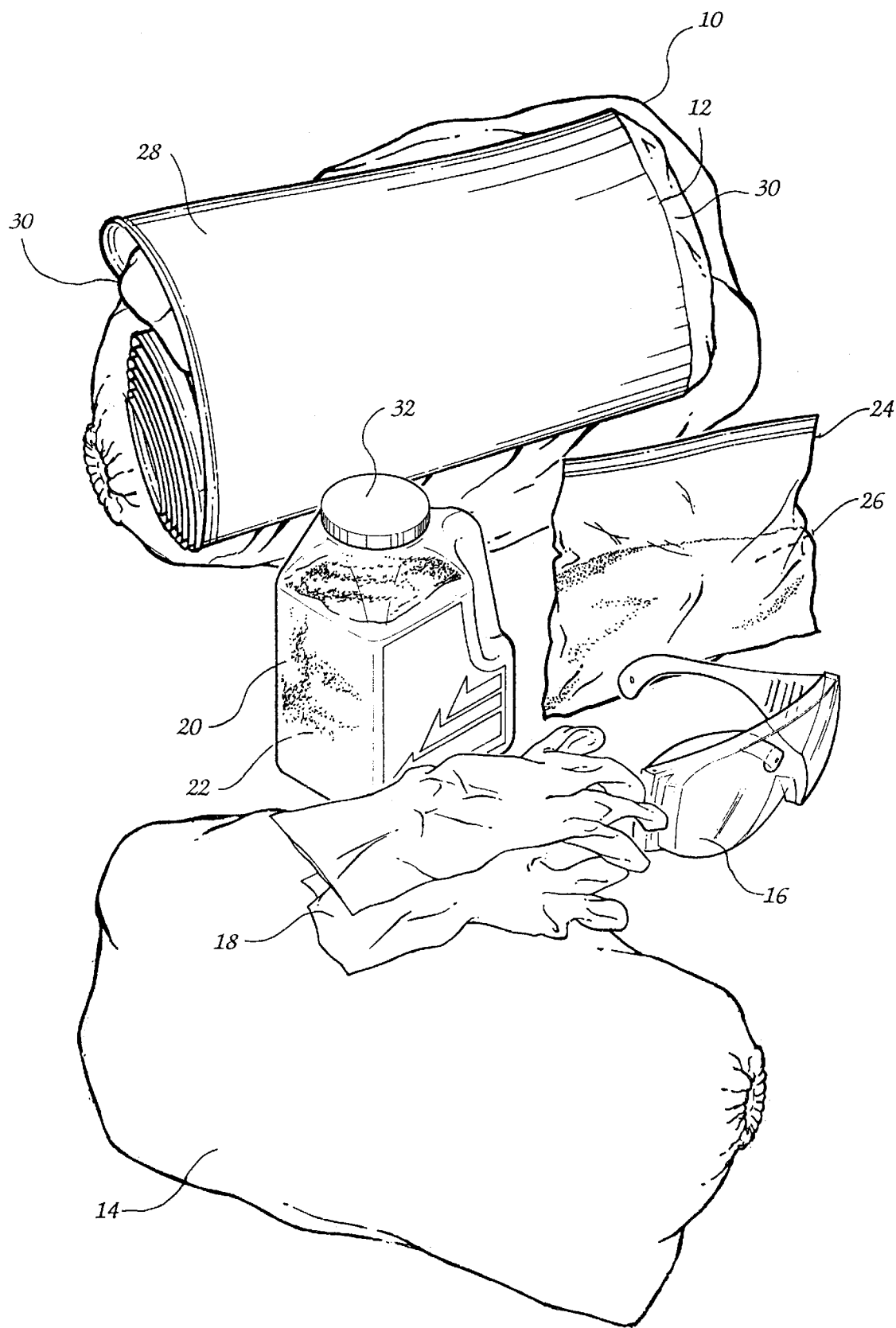
FIG. 1 is a perspective view of the separate components of the preferred embodiment of the system of the present invention.
Figure 3:
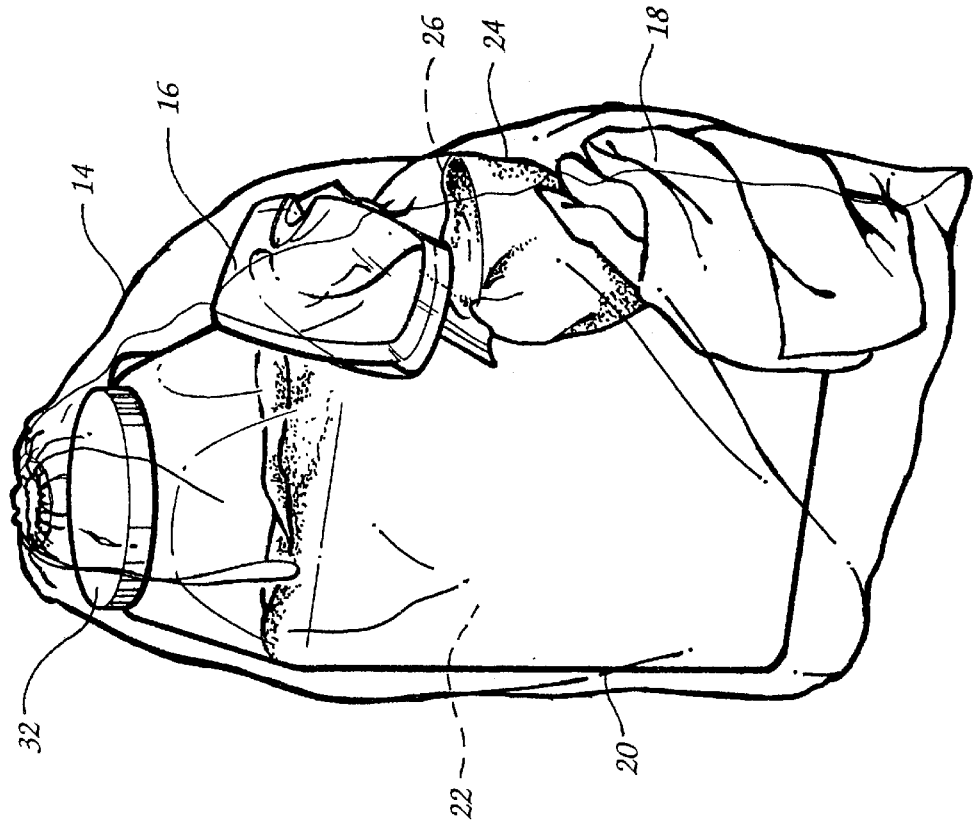
FIG. 3 is a perspective view of the stowed disposition of the microbial material container, polymer-based material container, safety glasses, and safety gloves in a bag.
Figure 2:
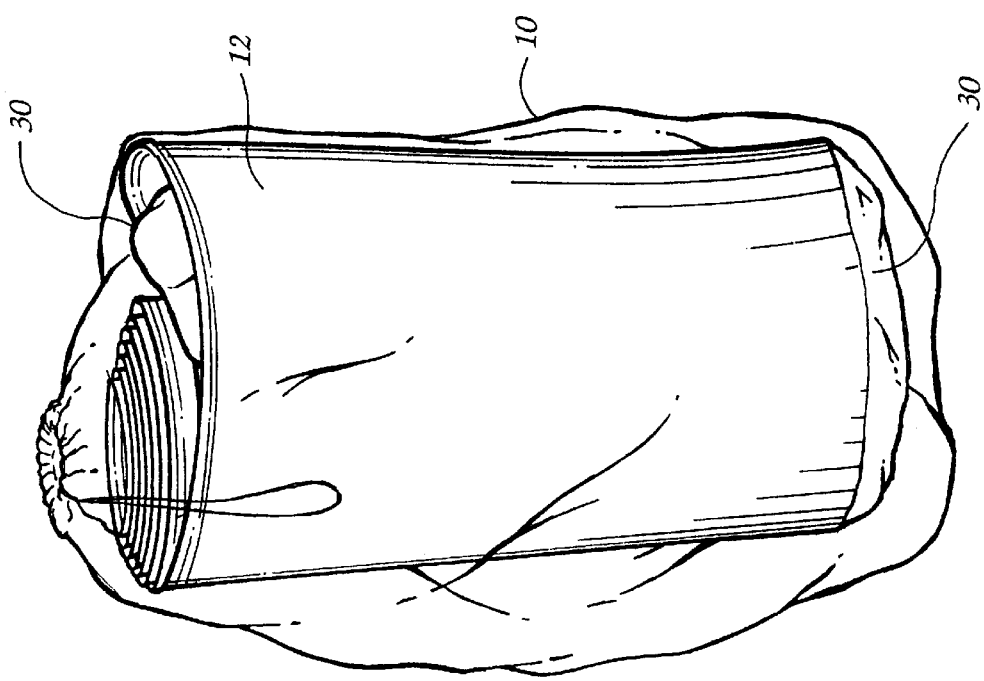
FIG. 2 is a perspective view of the pool in its stowed disposition in a bag.

FIGS. 1, 2 and 3 show a clear plastic bag 10 in which a containment pool 12 is stowed in rolled-up form and a clear plastic bag 14 in which safety glasses 16, safety gloves 18, a container 20 containing microbial material 22, and a container 24 containing a petroleum bonding polymer-based material 26 are stowed.

The containment pool 12 is formed of plastic material with a resilient side wall 28 and a flaccid bottom wall 30. This may be the same type of pool that is commonly used as a portable play pool for children, which can be stowed by rolling up the side wall 28 with the bottom wall 30 collapsed therein and when unrolled the side wall 28 will assume an upright disposition for receipt of liquid material. In this case, the liquid material would be usually petroleum in the form of diesel fluid leaking or spilling from the fuel tank of a tractor-trailer truck.

The safety glasses 16 and safety gloves 18 are of the type commonly used in industry.

The container 20 for the microbial materials 22 is a conventional plastic jug having a wide mouth and a screw cap 32. The microbial materials 22 may be of any known type that attacks liquid hydrocarbons such as petroleum fuel. It is preferably a dry powder product that effectively interlocks with liquid hydrocarbons, removing their oily properties and reducing volatilization. A particularly useful microbial material is that sold under the name the Oppenheimer Formula, which is an enzymatic mixture of active hydrocarbon oxidizing natural single-celled organisms contained in an inert preparation of natural clay, sold by Oppenheimer Environmental Company of Austin, Tx. This material is in powder form and contains a concentrated biological enzyme with microbial activity by degrading the hydrocarbons of the petroleum biologically to fatty acids, and does this rapidly. In the case of diesel fuel, the fuel can be degraded and absorbed in seconds. When the absorption is complete, the material can be readily handled and actually used as a soil nutrient or conditioner by applying it to flower gardens or lawns, for example. More commonly it can simply be dumped into a roadside ditch where it is harmless, and, if degradation has not been completed, it will be completed in a short time.

The container 24 for the polymer-based material 26 is a conventional plastic bag with a zip-lock closure. The polymer-based material 26 is preferably of the type that is conventionally used for immobilizing petroleum-based, water-borne liquid spills by coagulating and bonding the liquid. An example of such material is marketed by Nochar, Inc., of Indianapolis, Ind., under the trade name NOCHAR'S A610. This is a non-toxic, non-hazardous, non-corrosive, environmentally friendly petroleum bonding agent primarily for water-borne spills of petroleum-based products. It is a dry granular material specifically designed to immobilize petroleum-based, water-borne liquid spills by coagulating and bonding the liquid into a mass with minimal volumetric increase and which retains the liquid for easy removal. In doing so, it eliminates the dripping sponge effect by not allowing the liquid to be squeezed out and minimizes any residue or contamination. It does not pick up any water in the process of bonding with the petroleum-based spill.

In the present invention, the petroleum bonding polymer-based material 26 can be used where the petroleum that has leaked or spilled into the containment pool 12 includes water as well as petroleum, or it can be used where the petroleum has spilled or leaked into water on the ground before the containment pool has been deployed. In some cases it can be used without deploying the containment pool where the leakage or spill has been stopped before the pool 12 has been deployed.

Typically, the bags 10 and 14 with their contents are stowed on a vehicle, such as in the cab of a tractor-trailer rig or in some convenient location outside the cab.

Most often the system of the present invention would be used where a fuel tank 34 on the side of a cab 36 of a tractor-trailer rig has been damaged causing diesel fuel to leak. Such leaking or spilling can occur as a result of an accident on the highway or, more frequently, by unintentional contact of the fuel tank 34 with a curb, post or other object at a truck terminal.

Figure 4:
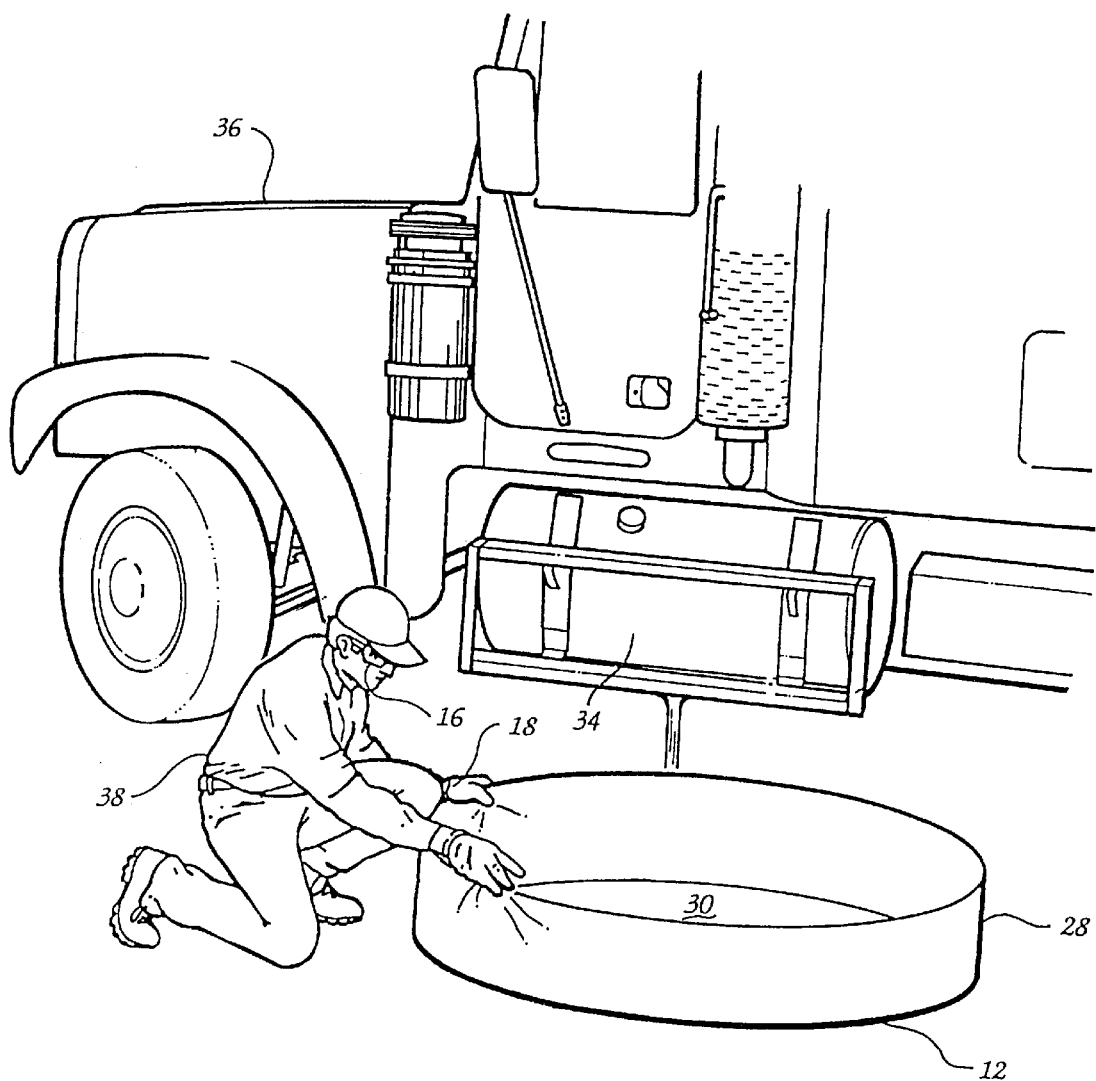
FIG. 4 is a perspective view of an attendant initially deploying the containment pool of FIG. 1 adjacent a vehicle from which a petroleum product is leaking.
Figure 5:
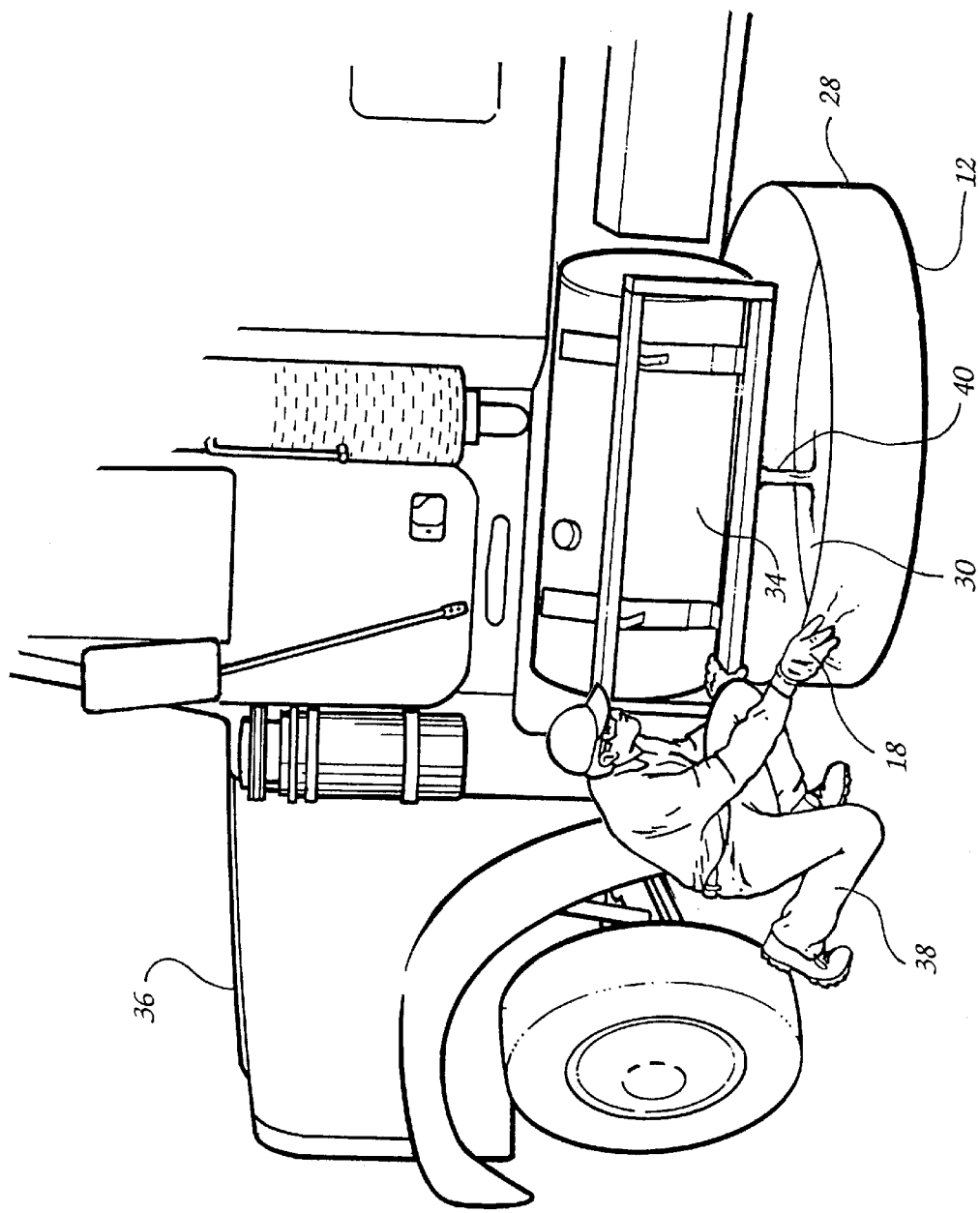
FIG. 5 is a perspective view similar to FIG. 4 with the attendant deploying the containment pool under the petroleum leaking from the vehicle.

When a driver 38 becomes aware of a leakage or spill, such as from a fuel tank 34, he removes the bags 10 and 14 from the cab 36. He then removes the containment pool 12 from its bag 10 and opens it adjacent the cab 36, as shown in FIG. 4. He then deploys the pool 12 under the leak from the fuel tank 34 so that the leaking fuel is received in the pool 12, as shown in FIG. 5.

The driver 38 then attempts to stop the leak or waits until there is no more spilling or leakage, leaving a quantity of petroleum 40 in the pool 12 (FIG. 6). Then, with the safety glasses 16 in place and the gloves 18 on his hands, he removes the screw cap 32 from the container 20 for the microbial material 22 and pours the material 22 into the petroleum 40 in the pool 12 (FIG. 7), the microbial material biologically degrading the hydrocarbons to harmless fatty acids. The residue 42 can be dumped without environmental harm from the containment pool 12, which can be rolled up and placed back in its bag 10 for stowing for future use.

Figure 9:
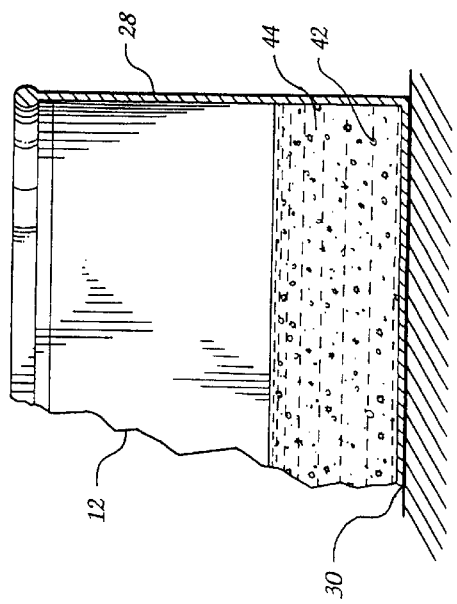
FIG. 9 is a view similar to FIG. 6 showing the residue remaining in the pool after the polymer-based material has been poured into the pool.
Figure 8:
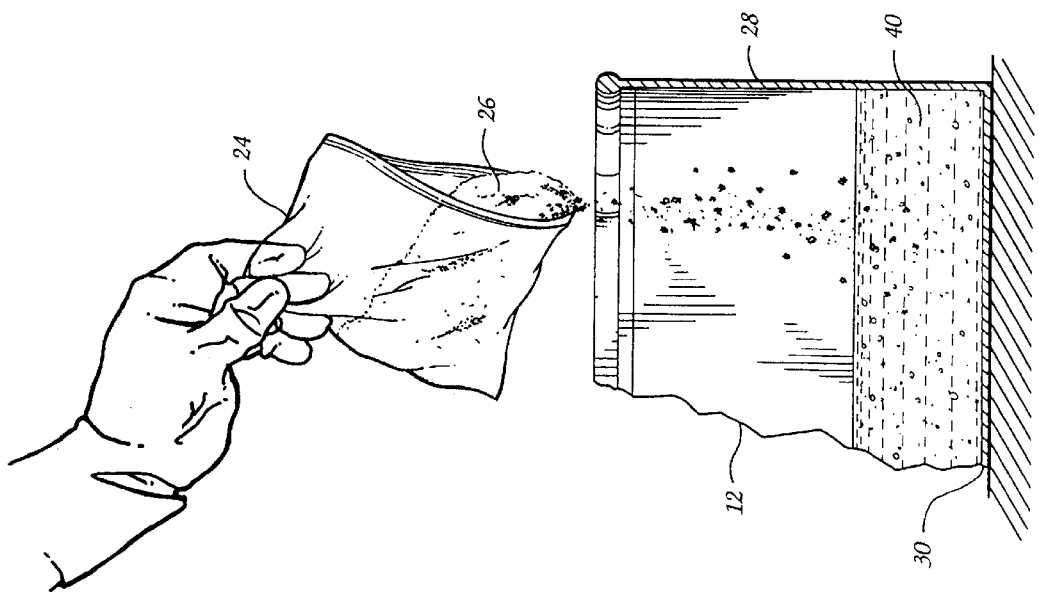
FIG. 8 is a view similar to FIG. 6 showing polymer-based material being poured into water in the pool.

Any petroleum that has leaked into water before the pool has been placed, such as when petroleum leaks into a roadway gutter or ditch, or when there is water in the pool 12 in addition to petroleum 40, the petroleum bonding polymer-based material 26 can be dispensed from the container 24 by the driver 38 onto the petroleum containing liquid. FIG. 8 illustrates pouring of the polymer-based material 26 from the container 24 into liquid-containing petroleum 40 in the pool 12, but it can as well be poured onto petroleum-containing liquid outside the pool. FIG. 9 illustrates the solidified petroleum material 42 separate from the water 44 in which it was originally dispersed.

The unique advantages of the present invention allow anyone who may be faced with petroleum spills, such as long-haul truck drivers, to easily and conveniently store the system so that it is ready for use on immediate notice. The system effectively handles petroleum spills which can be contained in the pool 12, spills on dry land, and spills into water. The pool 12 can be deployed rapidly, and the microbial material 22 and polymer-based material 26 can be quickly brought into action. The system also allows safety equipment in the form of safety glasses 16 and safety gloves 18 to be readily accessible and stored with the rest of the system It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A system for controlling and absorbing spills of petroleum products, comprising:

a disposable containment pool for receiving petroleum products as said products are spilled, said pool having resilient sidewalls and a flaccid bottom wall, thereby allowing said pool to be collapsed and rolled into a stowable disposition prior to disposing said pool for receiving petroleum products, said sidewalls assuming an upright position for receipt of spilled petroleum products upon unrolling of said pool; and a quantity of microbial materials for biodegrading petroleum products upon dispersion of said microbial materials in petroleum products received in said containment pool.

2. The system as set forth in claim 1, further comprising a quantity of petroleum-bonding polymer-based material for dispersion onto a body of water into which petroleum products have spilled to bond together said polymer-based material and said petroleum in said body of water to form a residue.

3. The system as set forth in claim 2, further including safety glasses and safety gloves to be worn by an attendant disposing the pool and dispersing the microbial materials.

4. The system as set forth in claim 3, further including a container for containing said microbial materials prior to dispersion thereof, a first bag for stowing said pool in its collapsed stowable disposition, and a second bag for stowing said microbial material container, said safety glasses, and said safety gloves.

5. The system as set forth in claim 2, further including a container for storing said polymer-based material prior to dispersion thereof, a container for containing said microbial materials prior to dispersion thereof, a first bag for containing said pool in collapsed stowable disposition, and a second bag for stowing said polymer-based material container and said microbial material container.

6. The system as set forth in claim 5, in which said second bag is for stowing said microbial material container, said polymer-based material container, and said safety glasses and safety gloves.

7. A method for controlling and absorbing leaks of petroleum products from vehicles, comprising:

providing a system having a containment pool and a quantity of microbial materials for biodegrading petroleum products, said pool having resilient sidewalls and a flaccid bottom wall, thereby allowing said pool to be collapsed and rolled into a stowable disposition prior to disposing said pool for receiving petroleum products, said sidewalls assuming an upright position for receipt of spilled petroleum products upon unrolling of said pool;

disposing said containment pool from a stowable disposition into an open position to receive and contain any petroleum products leaking from said vehicle;

dispersing said microbial materials into any petroleum products which have spilled into said pool and onto other dry surfaces in order to biodegrade said petroleum products; and removing any of said microbial materials remaining after said biodegradation.

8. The method of claim 7, further comprising providing a quantity of polymer-based material for bonding with petroleum products, dispersing said polymer-based material onto any body of water into which said petroleum products have spilled in order to bond said polymer-based material together with said petroleum products to form a residue, and removing any of said residue.

* * * * *